(12) United States Patent
Ivanov et al.

(10) Patent No.: US 10,598,759 B2
(45) Date of Patent: Mar. 24, 2020

(54) OBTAINING OF RADIO FINGERPRINTS WITH REDUCED COLLECTING SCOPE

(71) Applicant: HERE GLOBAL B.V., Eindhoven (NL)

(72) Inventors: Pavel Ivanov, Tampere (FI); Lauri Aarne Johannes Wirola, Tampere (FI); Henri Jaakko Julius Nurminen, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/038,637

(22) Filed: Jul. 18, 2018

(65) Prior Publication Data

US 2020/0025860 A1    Jan. 23, 2020

(51) Int. Cl.
*G01S 5/02* (2010.01)
*H04W 64/00* (2009.01)
(Continued)

(52) U.S. Cl.
CPC ............ *G01S 5/0252* (2013.01); *G01S 5/021* (2013.01); *G01S 19/01* (2013.01); *H04L 67/22* (2013.01);
(Continued)

(58) Field of Classification Search
CPC ... H04L 41/147; H04L 43/106; H04L 47/724; H04L 47/781; H04L 47/821; H04L 65/1046; H04L 41/0896; H04L 12/2818; H04L 67/025; H04L 67/12; H04L 67/125; H04L 67/18; H04L 67/22; H04W 48/04; H04W 48/08; H04W 4/22; H04W 4/02; H04W 28/0289; H04W 88/06; H04W 48/02; H04W 48/06; H04W 48/12; H04W 28/0284; H04W 28/10; H04W 36/22; H04W 36/32; H04W 4/00; H04W 4/021; H04W 4/027; H04W 60/04;
(Continued)

(56) References Cited

U.S. PATENT DOCUMENTS 8,688,396 B2    4/2014 Lin et al.
9,491,655 B2    11/2016 Gao et al.
(Continued)

OTHER PUBLICATIONS

Extended European Search Report for Application No. 19 18 6816 dated Dec. 5, 2019, 9 pages.

*Primary Examiner* — Nimesh Patel
(74) *Attorney, Agent, or Firm* — Alston & Bird LLP (57) ABSTRACT

A method is provided that includes collecting radio fingerprints with each fingerprint including a radio signal measurement of a radio environment of a mobile device and a respective location estimate. The method also includes determining whether the location of the mobile device is part of a routine or deviates from a routine and, in case the location of the mobile device is part of a routine, at least partially performing the collecting of radio fingerprints with a reduced collecting scope compared to a collecting scope used in case the location of the mobile device deviates from a routine. The collecting of radio fingerprints, when the location of the mobile device is part of a routine, is configured such that, after collecting radio fingerprints for multiple occurrences of the respective routine, a coverage of the respective routine by the collected radio fingerprints is increased.

18 Claims, 6 Drawing Sheets

(51) Int. Cl.
*H04W 4/029* (2018.01)
*G01S 19/01* (2010.01)
*H04L 29/08* (2006.01)

(52) U.S. Cl.
CPC ......... *H04W 4/029* (2018.02); *H04W 64/006* (2013.01)

(58) Field of Classification Search
CPC ........... H04W 64/006; H04W 72/0486; H04W 76/007; H04W 40/20; H04W 48/10; H04W 4/023; H04W 4/08; H04W 52/0216; H04W 72/0493; H04W 72/06; H04W 72/1252; H04W 48/16; H04W 52/0229; H04W 52/0254; H04W 48/18; H04W 4/025; H04W 64/00; H04W 8/005; H04W 4/029; H04W 52/0209; H04W 52/0245; H04W 36/08; H04W 36/36; H04W 88/02; H04M 2242/28; H04M 7/0057; H04M 2250/02; H04M 1/6075; H04M 2250/74; H04M 1/7253; H04M 1/72552; H04M 1/72563; H04M 2250/14; H04M 1/271; H04M 1/6066; H04M 1/72569; H04M 1/66; H04M 11/007; H04M 1/0202; H04M 1/236; H04M 1/64; H04M 1/72519; H04M 2250/52; H04M 3/42034; H04M 3/533; G01S 5/0252; G01S 5/021; G01S 19/01
See application file for complete search history.

(56) References Cited

U.S. PATENT DOCUMENTS

| | | | |
|---|---|---|---|
| 9,503,858 B2 | 11/2016 | Palanki et al. | |
| 2009/0068970 A1* | 3/2009 | Ahmed ................. | H04W 48/16 455/161.1 |
| 2009/0131081 A1* | 5/2009 | Abdel-Kader ........ | H04W 48/16 455/456.6 |
| 2010/0172274 A1* | 7/2010 | Wu ....................... | H04W 48/16 370/311 |
| 2011/0105109 A1* | 5/2011 | Uemura ................ | H04W 24/10 455/422.1 |
| 2011/0182238 A1 | 7/2011 | Marshall et al. | |
| 2011/0201348 A1 | 8/2011 | Murray et al. | |
| 2012/0084248 A1 | 5/2012 | Gavrilescu | |
| 2012/0264446 A1* | 10/2012 | Xie ....................... | G01C 22/00 455/456.1 |
| 2013/0031047 A1 | 1/2013 | Boazi et al. | |
| 2013/0090939 A1* | 4/2013 | Robinson .............. | G06Q 50/22 705/2 |
| 2014/0094187 A1 | 4/2014 | LaMarca et al. | |
| 2015/0310566 A1* | 10/2015 | Smyth ................... | G06Q 40/125 705/32 |
| 2016/0035196 A1* | 2/2016 | Chan .................... | G08B 25/008 340/541 |
| 2016/0205219 A1 | 7/2016 | Wang et al. | |
| 2017/0094454 A1 | 3/2017 | Pon | |
| 2017/0238205 A1* | 8/2017 | Syrjarinne ............. | H04W 4/02 455/456.6 |

* cited by examiner

OBTAINING OF RADIO FINGERPRINTS WITH REDUCED COLLECTING SCOPE

FIELD OF THE DISCLOSURE

The invention relates to the field of positioning and more specifically to the collection of radio fingerprints with mobile devices for use in radio map generation.

BACKGROUND

Seamless and all time available positioning methods require novel systems and solutions that are specifically developed (and if necessary also deployed) for this purpose. The traditional positioning technologies, which are mainly used outdoors, i.e. satellite and cellular positioning technologies, cannot always deliver the desired performance that would enable seamless and equal navigation experience at all time, particularly indoors. As examples, required positioning accuracy (2-3 m), coverage (~100%) and floor detection are challenging to achieve with satisfactory performance levels with the systems and signals that were not designed and specified for every use case in the first place. For instance, in case of indoor positioning, satellite-based radio navigation signals simply do not penetrate through the walls and roofs for the adequate signal reception and the cellular signals often have a too narrow bandwidth for accurate ranging by default. But also in outdoor scenarios, there may be the case of insufficient coverage of e.g. satellite-based radio navigation, for instance in case of bad weather or urban street canyons.

Several dedicated solutions have already been developed and commercially deployed during the past years e.g. solutions based on technologies like pseudolites (GPS-like short-range beacons), ultra-sound positioning, Bluetooth or Bluetooth LE signals and WLAN fingerprinting. What is typical to these solutions is that they require either deployment of totally new infrastructure (such as beacons or tags) or manual exhaustive radio-surveying of the streets and buildings including all the floors, spaces and rooms. This is rather expensive and will take a considerable amount of time to build the coverage to the commercially expected level, which can in some cases narrow the potential market segment to only a very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an alternative positioning solution to be commercially successful it needs to be globally scalable, have low maintenance and deployment costs, and offer acceptable end-user experience. This can best be achieved, if the solution is based on an existing infrastructure in the buildings and on existing capabilities in the consumer devices. Accordingly, such a positioning is preferably based on technologies like Wi-Fi- and/or Bluetooth (BT)-technologies that are already supported in almost every smartphone, tablet, laptop and even in the majority of the feature phones. It is, thus, required to find a solution that uses such cellular or non-cellular radio signals in such a way that makes it possible to achieve 2-3 m horizontal and vertical positioning accuracy with the ability to quickly build the global coverage for this approach.

One approach for such radio-based positioning models e.g. the WLAN radio environment (or any similar radio e.g. Bluetooth) from observed Received Signal Strength (RSS)-measurements as (e.g. 2-dimensional) radio maps.

For this, accordingly high volumes of radio signal measurement data (so called radio fingerprints or simply fingerprints) need to be harvested via crowd-sourcing if the consumer devices are equipped with the necessary functionality to enable the radio signal data collection as a background process, naturally with the end-user consent. It could also be possible to use volunteers to survey the sites in exchange of reward or recognition and get the coverage climbing up globally in the places and venues important for the key customers. However, the technical challenges related to the harvesting, processing, redundancy, ambiguity and storing the crowd-sourced data need to be understood and solved first, before the radiomap creation can be based on the fully crowd-sourced data.

Specifically because crowd-sourcing is often a background process that does not directly benefit the device user, it is desirable that the crowd-sourcing process only consumes limited resources of the device. This is particularly problematic, because the described crowd-sourcing technique (even though very powerful) often produces close to 100% redundant data, i.e. the data is collected multiple times by the same device for the same location.

This can be understood by considering the typical daily routes people are travelling or places people are staying: from home to kindergarten to the work place back to the kindergarten and back home. Moreover, people stay most of the day at the workplace and nights at home, also part of the evening time.

Therefore, if crowdsourcing samples are taken e.g. periodically at fixed intervals, most of the data collected will be taken at same locations or along same routes over and over again. Thus, in the end it turns out that a large part (easily >90%) of the contributed data is just a repetition of already collected data.

This easily wastes resources not only on the client side, because of excessive using of the GNSS-based positioning, of WLAN scans and of data transmittal, but also on the server side, where typically all the incoming data needs to be processed.

Approaches of finding a balance between data collection and saving resources may comprise only collecting data, whenever some other application uses GNSS-based positioning, not taking samples during the night time or taking data samples at fixed time or spatial intervals (e.g. every 10 minutes, every 500 meters).

However, these approaches do often not provide optimal results regarding a saving of resources. Additionally, such approaches have the drawback that, depending on the approach, for certain scenarios or phases no data is collected at all, e.g. when no application uses the GNSS-based positioning or during the night time. This may in particular be problematic, because e.g. changes in the radio environment or infrastructure become hard to detect and, in the worst case, are not detected at all.

SUMMARY OF SOME EMBODIMENTS OF THE INVENTION

Thus, it is inter alia an objective of the present application to mitigate the above described drawbacks and in particular to save resources when performing crowd-sourcing but at the same time ensuring the detection of radio environment changes at all times and places as reliable as possible. Certain embodiments of the invention may in particular maximize the spatial coverage of the data collected by respective mobile devices, which would then contribute to maximizing the overall spatial coverage of the data collected by a correspondingly larger device base.

According to an exemplary aspect of the invention a method, performed by at least one apparatus, is disclosed, the method comprising:
  collecting radio fingerprints, each fingerprint comprising a radio signal measurement of a radio environment of a mobile device and a respective location estimate;
  determining whether the location of the mobile device is part of a routine or deviates from a routine;
  in case the location of the mobile device is part of a routine, at least partially performing the collecting of radio fingerprints with a reduced collecting scope compared to a collecting scope used in case the location of the mobile device deviates from a routine;
  wherein the collecting of radio fingerprints, when the location of the mobile device is part of a routine, is configured such that, after collecting radio fingerprints for multiple occurrences of the respective routine, a coverage of the respective routine by the collected radio fingerprints is increased.

The method may for instance be performed and/or controlled by an apparatus, for instance by the mobile device and/or a server or server cloud, e.g. an apparatus according to the exemplary aspects.

According to a further exemplary aspect of the invention an apparatus is disclosed, comprising means for performing a method according to the exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

According to a further exemplary aspect of the invention, an alternative apparatus is also disclosed comprising at least one processor and at least one memory including computer program code; the at least one memory and the computer program code configured to, with the at least one processor, cause the apparatus to at least perform a method according to the exemplary aspect of the invention.

The above-disclosed apparatuses according to any aspect of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to a further exemplary aspect of the invention, a computer program code is disclosed, the computer program code, when executed by a processor, causing an apparatus to perform a method according to the exemplary aspect of the invention.

The computer program may be stored on computer-readable storage medium, in particular a tangible and/or non-transitory medium. The computer readable storage medium could for example be a disk or a memory or the like.

The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further aspect of the invention, a non-transitory computer readable storage medium in which computer program code is stored, the computer program code when executed by a processor causing at least one apparatus to perform a method according to the exemplary aspect of the invention. The storage medium may be a tangible storage medium, for example a tangible computer-readable storage medium, e.g. as described above. The storage medium may be a storage medium of a mobile device, for example an apparatus according to the exemplary aspects of the invention.

In the following, exemplary features and exemplary embodiments of all aspects of the present invention will be described in further detail.

In case the apparatus performing the method is or comprises the mobile device, the radio fingerprints may be collected by taking respective radio signal measurements and determining respective location estimates by the mobile device. Alternatively or additionally, particularly in case the apparatus performing the method is or comprises a server, the radio fingerprints can also be collected by e.g. receiving respective radio fingerprints at the server from the mobile device.

Radio signals of a radio environment of the mobile device (e.g. taken at a radio interface of the mobile device) may in particular be signals of a cellular or non-cellular communication network.

Examples of a cellular communication system or network are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication network.

Examples of a non-cellular communication network on the other hand are a WLAN network, a Bluetooth (LE) network, a ZigBee network, a radio-frequency identification (RFID) network, a Near Field Communication (NFC) network, or even a broadcasting network such as for instance Digital Video Broadcasting (DVB), Digital Audio Broadcasting (DAB) or Frequency-Modulated (FM)/Amplitude-Modulated (AM) network.

A cellular communication network may for instance be characterized by a basically seamless pavement of a geographical area (usually in the order of at least hundreds or thousands of square kilometers) with cells in which coverage is provided by respective nodes of the communication network that are operated by the same operator, which network may for instance support communication handover between cells. Consequently, a non-cellular communication network may be characterized as a communication network that does not have all of these properties.

Further examples of radio signals are radio signals of a Low-Power Wide-Area Network (LPWAN), also called a Low-Power Wide-Area (LPWA) network or Low-Power Network (LPN), which may be of a cellular or non-cellular type. An LPWAN may be understood as a type of wireless communication network designed to allow long range communications (e.g. over hundreds of meters or over kilometers) at a low bit rate among things (connected objects), particularly if operated on battery power. Frequencies employed may in particular be in the MHz regime (e.g. 868 MHz or 902 MHz). The low power, low bit rate and intended use distinguish this type of network from e.g. a wireless WAN or LAN that is designed to connect users or businesses, and carry more data, using more power. In exemplary embodiments, the LPWAN data rate may be limited to 2 Mbit/s or less, 1 Mbit/s or less, or even 250 kbit/s or less. The data rate may for instance be a maximum or achievable data rate. The described data rates may thus in particular be used for providing or obtaining the data described herein.

The Low Power Wide Area Network may for instance be based on LoRa technology (e.g. LoRaWAN), which is a chirp spread spectrum (CSS) radio modulation technology. Alternatively, the Low Power Wide Area Network may be based on Ultra Narrow Band (UNB) modulation technology.

One non-limiting example of a Low Power Wide Area Network is a Sigfox network. The frequencies used are 868 MHz and 902 MHz. Such communication supports up to 140 uplink messages a day (from first to second apparatus), each of which can carry a payload of 12 Bytes (excluding message header and transmission information) and up to 4 downlink messages per day (from second to first apparatus), each of which can carry a payload of 8 Bytes.

Another non-limiting example of a Low Power Wide Area Network is a NarrowBand IoT (NB-IoT) network, standardized by the 3rd Generation Partnership Project (3GPP). The NB-IoT technology may be deployed in-band in spectrum allocated to Long Term Evolution (LTE), using resource blocks within a normal LTE carrier (or in the unused resource blocks within a LTE carrier's guard-band) or stand-alone for deployments in dedicated spectrum. Examples of NB-IoT technologies are LTE Cat 1, LTE Cat 0, LTE Cat M1 (eMTC), LTE Cat NB1 (NB-IoT) or EC-GSM-IoT.

A radio signal measurement may comprise a measurement of one or more signals observable at the position, at which the measurement was taken (i.e. at the position of the mobile device). The radio measurement may comprise one or more characteristics of the observed radio signal. For instance, a characteristic of a radio signal may be the signal strength of received signals (received signal strength indication RSSI or physical Rx level, e.g. in dBm with reference 1 mW), path loss estimates and/or timing measurements like propagation delay, timing advance (TA) or round-trip time (RTT). The radio measurement may alternatively or additionally comprise a (global or local) identifier of the emitter of the respective radio signal. Non limiting examples of such identifiers are a Cell Identity CID, such as UTRAN Cell ID (UC-ID) or an LTE Cell Identity in case of cellular communication networks or a (basic) service set identification (BSSID or SSID) or a medium access control (MAC) address in case of non-cellular communication network. The radio measurement may in particular be taken from a communication network, which is used by the mobile device for communication.

The respective location estimate may directly indicate or be representative of the position, at which the radio signal measurement was taken, i.e. of the mobile device. For instance, the location estimate may be determined based on a satellite based network, such as a global navigation satellite system. Examples of global navigation satellite systems (GNSS) are the "Global Positioning System" (GPS), "Galileo", the "Global Navigation Satellite System" (i.e. "Globalnaja Nawigazionnaja Sputnikowaja Sistema", GLONASS), the "BeiDou Navigation Satellite System" (BDS), or the "Quasi-Zenith Satellite System" (QZSS), to name some examples. Additionally or alternatively, the location estimate may be based on another technology, for instance on one or more types of the already described cellular or non-cellular networks (e.g. WLAN based).

It shall briefly be explained how the collected fingerprints are further utilized, eventually for positioning of an end user device. After respective radio fingerprints are collected, e.g. at a respective mobile device, they are usually sent (e.g. uploaded) to and collected at a server or a server cloud. There, algorithms can be run to generate a radio map, e.g. comprising a model of respective wireless communication nodes and/or their coverage areas for positioning purposes based on the radio fingerprints received from the mobile device (and other mobile device of other users). Such models may comprise or be based on one or more of coverage areas, node positions, radio propagation models, Rx fields, etc. A corresponding positioning process of an end user device based on a respective radio map can generally function in two modes. The first mode is a terminal-assisted mode, in which the end user device performs the measurements of respective radio signal measurements, provides the measurements to a remote server, which in turn provides the position estimate back to the device. The second mode is the terminal-based mode, in which the end user device has a local copy of the radio map (or, most likely, a subset of a global radio map). This subset is downloaded by the end user device from a remote server for the area of interest (e.g. a small area around the current location, for a whole country, or so). This subset can also be pre-installed to the end user device in the factory, but even in that case the radio map data needs to be refreshed at some point. Although the end user device may have a GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors and in urban canyons, which are generally challenging environments for GNSS-based technologies.

According to the described method, it is determined whether the location of the mobile device is part of a routine or deviates therefrom. A routine may in particular be understood as a location pattern over time. The location(s) of the routine are thus visited routinely (i.e. repeatedly and/or regularly) when considering the locations of the user (and thus the mobile device). For instance, a routine may be understood as a place visited regularly or a route traveled regularly. Thus, a routine may be understood to comprise at least a spatial component. For instance, staying at place A or a travelling a route from A to B may be considered a routine. Accordingly, if the location of the mobile device is at place A or on a route from A to B, the location of the mobile device may be considered as being part of a routine. Additionally, a routine may also comprise a temporal component. For instance, if a routine comprises travelling a route from A to B in the morning, a route from A to B at another time may not necessarily be considered as the same routine.

Determining whether the location of the mobile device is part of a routine or deviates from a routine may be based on one or more location estimates of the mobile device, for instance on one or more location estimates of respective fingerprints. On the one hand, when the location of the mobile device is part of a routine, it may be assumed that fingerprints for respective locations (in particular for the same time of the day or week) have already been collected, in particular by the same device. The likelihood for re-collecting already collected (and thus redundant) data is therefore high. On the other hand, when the location of the mobile device deviates from a routine, it may be assumed that fingerprints for respective locations (in particular for the same time of the day or week) have not yet been collected. The likelihood for re-collecting already collected (and thus redundant) data is therefore low.

A collecting scope may be a spatial and/or temporal collecting scope, as will be explained in more detail below. The collecting scope can be understood as indicating the scope with which radio fingerprints shall be collected. The collecting scope or scope of collection may be or comprise information about a (spatial and/or temporal) density with which radio fingerprints shall be collected. The collecting scope may be or comprise information indicating (spatial or temporal) segments of the routine for which radio fingerprints shall be collected, which will also be explained in more detail below.

By at least partially performing the collecting of radio fingerprints for the routine with a reduced collecting scope, in case the location of the mobile device is part of a routine (compared to a collecting scope used in case the location of the mobile device deviates from a routine, e.g. from all known routines), the collection of at least a part of redundant data can be avoided or reduced. In other words, the data collection of radio fingerprints is performed in a restricted manner in case of a routine behavior of the user (and thus the mobile device). For instance, a first lower collecting scope may be used in case the location of the mobile device is part of a routine. For instance, a second higher (e.g. standard) collecting scope may be used in case the location of the mobile device deviates from a routine.

A reduced collecting scope may for instance be achieved by collecting less radio fingerprints over a certain distance or in a certain time. A reduced collecting scope may be achieved by only collecting radio fingerprints for certain segments of a routine. The collecting scope may be an effective or average collecting scope. The collecting scope may be reduced only for segments of the routine, or for the whole routine. The collecting scope may in particular be reduced on average e.g. with respect to the whole routine.

When it is determined or identified that the location of the mobile device is part of a routine (e.g. the location of the mobile device is in a place visited routinely or on a route travelled routinely), the collecting of radio fingerprints on or during the routine is configured such that a coverage of the respective routine by the collected radio fingerprints is increased after collecting radio fingerprints for multiple occurrences of the respective routine. Thus, as a result, the scope of collection may be effectively increased after multiple occurrences of the routine.

As explained, radio fingerprints collected when the location of the mobile device is part of a routine are highly likely redundant fingerprints. However, firstly, by still collecting (with a reduced collecting scope) a certain amount of radio fingerprints, even though the location of the mobile device is part of a routine, it is in particular possible to check the (likely redundant) radio fingerprints for consistency. Secondly, by configuring the collecting of radio fingerprints such that a coverage of the respective routine by the obtained radio fingerprints is increased after obtaining radio fingerprints for multiple occurrences of the respective routine, not always the same (likely) redundant radio fingerprints are obtained, but at least in part different radio fingerprints. For instance, the coverage of a respective routine by the collected fingerprints may be increased by obtaining radio fingerprints of a different route segment or time segment of a route travelled. As a result, the radio fingerprints collected during the same repeating routine increases the coverage of the respective routine with radio fingerprints. The increased coverage may for instance refer to an increased spatial coverage (e.g. radio fingerprints at more locations) and/or an increased temporal coverage (e.g. radio fingerprints at more points in time) of the routine. For instance, while fingerprints collected during a first occurrence of the routine may cover a first segment of the routine (e.g. a first route segment or a first time segment), fingerprints collected during a second occurrence of the routine may then cover a second segment of the routine. By way of example, and as also explained in more detail below, this may result in (after a sufficient number of repeated occurrences of the routine) collecting fingerprints covering the whole routine (e.g. covering the whole route or covering the whole time), e.g. as if the fingerprints were collected once with an unreduced collecting scope.

According to an exemplary embodiment of all aspects of the invention, the collecting of radio fingerprints, when the location of the mobile device is part of a respective routine, is configured such that, after collecting radio fingerprints for a sufficient number of occurrences of the respective routine, the collected radio fingerprints substantially cover the whole respective routine. That the collected radio fingerprints substantially cover the whole respective routine is understood to mean that radio fingerprints are collected substantially along the whole route and/or substantially throughout the whole time. However, radio fingerprints are typically only discrete measurements. Thus, substantially covering the whole routine may in particular understood that the obtained radio fingerprints are distributed substantially evenly with regard to locations and/or times of the routine. As already explained, this may result (after a sufficient number of occurrences of the routine) in a situation as if radio fingerprints were collected directly with a higher e.g. a standard collecting scope.

According to an exemplary embodiment of all aspects of the invention, a respective routine is divided into multiple segments, wherein, for a certain occurrence of a respective routine, radio fingerprints are collected only for a part of the segments of the respective routine. For instance, the segments may be distance or time segments, i.e. spatial or temporal segments. For instance, for a certain occurrence of a respective routine, radio fingerprints may be collected only for one of the segments of the respective routine. For instance, a modulo operation may be used for choosing the segment(s) for which radio fingerprints shall be collected. For instance, the routine may be divided into substantially equal segments. For instance, the routine may be divided into n segments and each segment may cover (approximately) 1/n-th of the routine (e.g. 1/n-th of the distance of a route of a routine or 1/n-the of the time of a routine). In one approach, it may also be randomly chosen, for which of the segments radio fingerprints are collected, as explained in more detail below.

According to an exemplary embodiment of all aspects of the invention, for each occurrence of a respective routine, radio fingerprints are collected for a segment of the respective routine other than for the previous occurrence of the routine. For instance, if the routine is divided into n segments, for the first occurrence of the routine (i.e. the mobile device travels along a route of a routine or stays at a place of a routine), radio fingerprints may be collected for the first segment of the routine. Then, for the second occurrence of the routine (i.e. the mobile device again travels along the route of the routine or again stays at the place of the routine, e.g. at another day), radio fingerprints may be collected for the second segment of the routine. This may continue for each occurrence of the routine until radio fingerprints are collected for all n segments of the routine (and e.g. repeated for further occurrences). As one example, if a routine occurs every day of the week (e.g. a route is travelled every day), then the routine may be divided into seven segments and each day radio fingerprints of a different segment may be collected.

According to an exemplary embodiment of all aspects of the invention, a respective routine is divided into multiple segments, wherein, for each segment, the probability that radio fingerprints are collected for the respective segment is smaller than 1. Thus, in particular the probability for starting or continuing collecting radio fingerprints for a respective segment is smaller than 1. As one example, the probability for collecting radio fingerprints for all segments may be the same, e.g. 0.5. By utilizing a probabilistic approach, radio fingerprints can be randomly collected for respective segments. This may allow for reducing e.g. a risk of a bias in the collected radio fingerprints, for instance, as compared to a constant or predefined collecting order for the different segments.

According to an exemplary embodiment of all aspects of the invention, a respective routine is divided into n segments, wherein, for each of the n segments, the probability that radio fingerprints are collected for the respective segment is inversely proportional to n. By choosing the probability proportional to 1/n, for the occurrence of the routine, radio fingerprints are collected for one segment on average. On average, after n occurrences of the routine, the collected radio fingerprints substantially cover the while routine. However, the radio fingerprints are collected at random time and in a random order, which may, as explained, in particular reduce a risk of a bias in the collected radio fingerprints compared to a constant and predefined order.

According to an exemplary embodiment of all aspects of the invention, the collecting scope is a spatial and/or temporal collecting scope. A spatial collecting scope may for instance indicate or be the number of fingerprints collected per travel distance. A temporal collecting scope may for instance indicate or be the number of fingerprints collected per unit time. For instance, a lower spatial collecting scope may be achieved by increasing the distance between two (e.g. consecutive) radio fingerprints collected. For instance, a lower temporal collecting scope may be achieved by increasing the time (and thus reducing the frequency) between two (e.g. consecutive) radio fingerprints collected.

According to an exemplary embodiment of all aspects of the invention, the method further comprises:
automatically determining one or more routines of the mobile device at least based on position information of the mobile device.

The position information of the mobile device used for determining respective routines may be historical position information (e.g. the position history of the mobile device) and/or present location information (e.g. of a route being traveled by the mobile device). The determining of the routines may be realized by machine learning approaches (e.g. by supervised or unsupervised learning). The position information of the mobile device used for automatically determining respective routines may for instance be or comprise the location estimates of radio fingerprints.

According to an exemplary embodiment of all aspects of the invention, the method further comprises:
obtaining visiting information of visits of the mobile device in predefined regions of a geographic area.

The geographic area may be the surface of the earth or a part thereof. The geographic area may be a country, a city or a part thereof, for instance. The geographic area may be or comprise typical locations of the mobile device. The predefined regions may divide the geographic area e.g. into squares, e.g. sized 1 km×1 km. However, other geometries (e.g. rectangle) or sizes of the predefined regions may be suitable as well.

The division into predefined regions and the obtaining of visiting information (which may be logged by the mobile device, for instance) may in particular be used for automatically determining routines of the mobile device. For instance, the number of times and/or the points in time (time stamps) the mobile device visits a respective predefined region may be logged. This can provide information of regularly and less-frequently visited areas. This information may form the basis for automatically determining routines of the mobile device.

Further, the predefined regions may also be used for defining (spatial) segments into which a routine (in particular a route) may be divided, as has been described above. For instance, a predefined region may be a (spatial) segment of a route of a routine. However, the segments of a routine may generally also be defined in other ways.

According to an exemplary embodiment of all aspects of the invention, the visiting information of a visit of the mobile device in a predefined region comprises one or more of:
information representative of a time of the visit,
information representative of a duration of the visit,
information representative of a frequency of the visit,
information representative of an amount of data collected for the predefined region, and/or
information representative of a quality of the data collected for the predefined region.

The information representative of a time of the visit (or time information) may indicate the time of entering a respective predefined region. The information representative of a duration of the visit (or duration information) may indicate the time from entering a respective predefined region until leaving the predefined region. The information representative of a frequency of the visit (or frequency information) may indicate the number of visits (e.g. the number of times of entering the predefined region) per time. The information representative of an amount of data collected for the predefined region (or data amount information) may be an absolute or relative amount. For instance, the amount of data may refer to the number of radio fingerprints collected for the predefined region. For instance, in case of a relative amount, the amount of data may indicate the relative amount compared to other predefined regions, such as 70% of the collected radio fingerprints were collected for a first predefined region, 30% of the collected radio fingerprints were collected for a second predefined region and 0% of the collected radio fingerprints were collected for a third predefined region. For instance, the information representative of a quality of the data collected for the predefined region may be or comprise information on a level of achieved accuracy of the location estimate of a collected fingerprint. For instance, the information representative of a quality of the data collected for the predefined region may be or comprise information on the type of method used for determining the location estimate of the mobile device (e.g. a network based method (such as WLAN, Bluetooth (LE) or cellular) or a satellite based method), which may also be considered as information representative of a level of accuracy. This may be useful, for example, in case location estimates of the previously collected radio fingerprints may have been based on radio network positioning only (WLAN, BLE or cellular positioning) resulting in a comparably low quality of the data collected. In this case, re-collecting data with a better accuracy (e.g. satellite based location estimates may be sensible).

According to an exemplary embodiment of all aspects of the invention, the method further comprises, upon entering a predefined region, deciding whether to:
  start or proceed with the collecting of radio fingerprints, or
  stop or refrain from the collecting of radio fingerprints.

Thus, every time the user or mobile device enters a predefined region, it may be decided how to proceed with the collecting of radio fingerprints. For instance, the decision may be based on the history of collected radio fingerprints for the respective predefined region. The process may for instance be used for realizing or supporting the above described process of collecting radio fingerprints with a desired collecting scope, for instance. However, this process may also be understood as a separate process and be used in addition or in the alternative to the process of collecting radio fingerprints as described above.

According to an exemplary embodiment of all aspects of the invention, the deciding is at least partially based on the visiting information. For instance, the decision may at least partially be based on the time information, duration information, frequency information and/or data amount information, as described above. For instance, in case the frequency of visits and/or the amount of data collected for a predefined region is below a predefined threshold, the collecting of radio fingerprints for the respective predefined region may be proceeded with or started. In case the frequency of visits and/or the amount of data collected for a predefined region is above a predefined threshold, the collecting of radio fingerprints for the respective predefined region may be stopped or refrained from.

According to an exemplary embodiment of all aspects of the invention, the deciding is at least partially based on a probability depending on the amount of data already collected for the predefined region. For instance, a binary random variable may be used. For instance, the probability of a decision to start or proceed with the collecting of radio fingerprints for a certain predefined region may be negatively correlated (e.g. inversely proportional) to the (e.g. relative) amount of data already collected for the predefined region. Thus, the more data already collected, the lower the probability of further data collection and vice versa. As already explained, the amount of data collected may refer to the number of collected radio fingerprints. For instance, in case a relative amount of data already collected is 70% for a first predefined region, 30% for a second predefined region and 0% for a third predefined region, then the probability of collecting radio fingerprints for the first predefined region is the lowest, higher for the second predefined region and highest for the third predefined region.

According to an exemplary embodiment of all aspects of the invention, wherein the method further comprises:
  obtaining a collecting scope to be used for a predefined region.

As already explained, the collecting of radio fingerprints for a routine is performed with a lower collecting scope compared to the case where the location of the mobile device deviates from the routine. In case the described approach of predefined regions is used, it may be advantageous to obtain a collecting scope to be used for respective predefined regions. The collecting scope can then be adjusted from predefined region to predefined region.

According to an exemplary embodiment of all aspects of the invention, the collecting scope is a predefined collecting scope or determined at least partially based on the visiting information. While the collecting scope already depends on whether the location of the mobile device is part of a routine or not, this dependency may be realized with the described approach. Alternatively, the collecting scope may additionally be influenced based on the visiting information of a respective predefined region.

According to an exemplary embodiment of all aspects of the invention, the apparatus is one of:
  a chip;
  a module for a server;
  a server;
  a module for a mobile device; and
  a mobile device.

It is to be understood that the presentation of the invention in this section is merely by way of examples and non-limiting.

Further, it is to be understood that the presentation of the invention in this section is merely exemplary and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description as provided in the above summary section of this specification.

Figure 1:
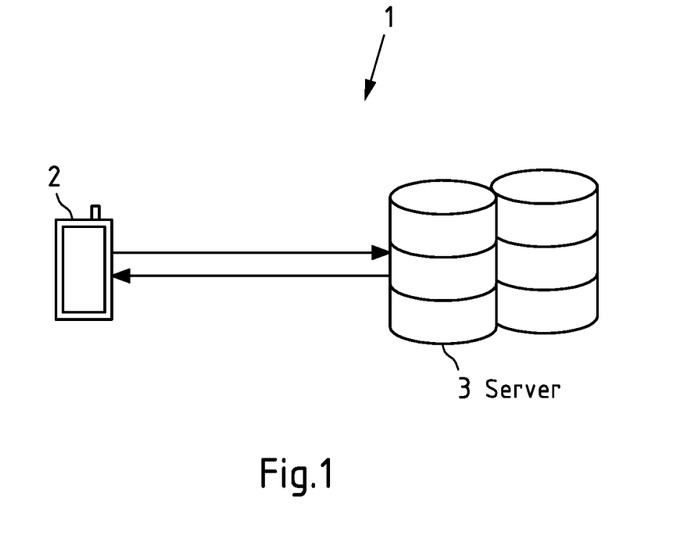
FIG. 1 is a block diagram of a system of exemplary apparatuses according to the invention.

FIG. 1 is a block diagram of a system 1 of a mobile device 2 and a server 3, which may both be exemplary embodiments of an apparatus according to the invention and which may separately or together perform exemplary embodiments of the method according to the invention, i.e. in particular collet radio fingerprints according to the invention. The details of mobile device 2 and server 3 are described with respect to FIG. 2, which is an exemplary block diagram of the mobile device 1 of FIG. 1, and FIG. 3, which is an exemplary block diagram of the server 3 of FIG. 1.

Figure 2:
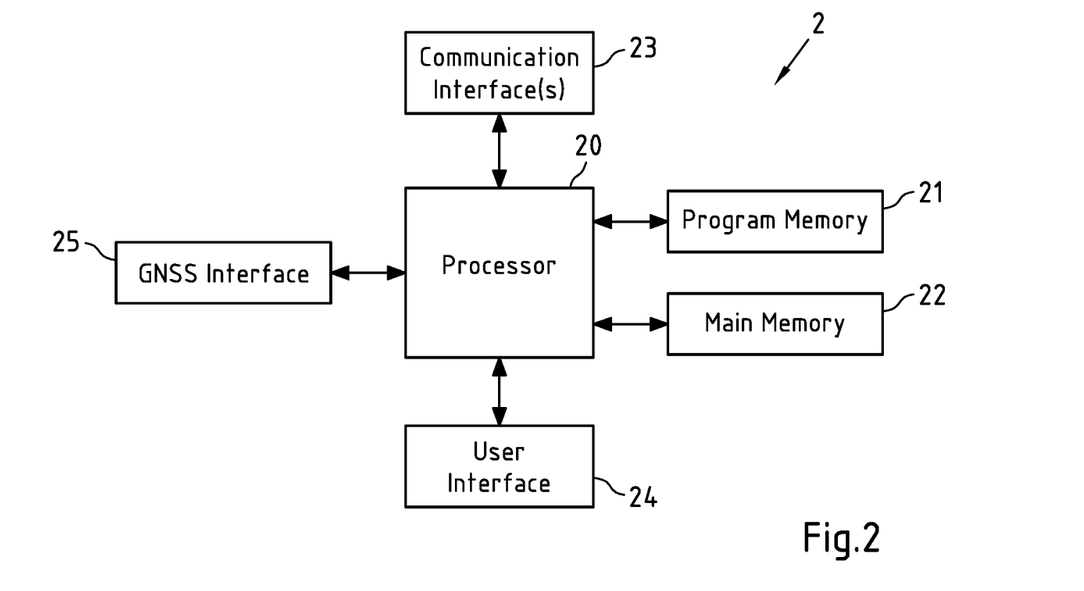
FIG. 2 is a block diagram of the mobile device of FIG. 1.

For instance, the mobile device 2 may be a part of or may be a cellular phone, a personal digital assistant, a laptop computer, a tablet computer or a wearable. Server 3 may be a server located remote from mobile device 2, for instance. Server 3 may also comprise multiple devices and/or may be realized as a computer cloud, for instance.

Turning now to FIG. 2, the mobile device 2 may be configured to take radio signal measurements and to determine a (in particular horizontal) location estimate of the mobile device 2, e.g. based on signals from a Global Navigation Satellite System (GNSS). Thus, the mobile device 2 is configured to collect radio fingerprints comprising radio signal measurements of the radio environment of the mobile device 2 and respective location estimates of the mobile device 2. However, the location estimate of the location of the mobile device 2 may also be obtained by observing measurements of the radio environment and/or by using inertial sensors of the mobile device 2.

In more detail, the mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform embodiments of the method according to the invention, when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from mobile device 2, for instance in the form of a removable SD memory card. Main memory 22 may for instance be a volatile memory. It may for instance be a RAM or DRAM memory, to give but a few non-limiting examples. It may for instance be used as a working memory for processor 20 when executing an operating system and/or programs. Radio fingerprints that are observed and collected by mobile device 2 and/or radio maps received from server 3 may for instance be stored in program memory 21 and/or main memory 22 of mobile device 2.

Processor 20 further controls one or more communication interfaces 23 configured to receive and/or output information. One or more of communication interfaces 23 may be used for taking radio signal measurements and may be configured to send and/or receive data to/from server 3. Mobile device 2 may be configured to communicate with server 3 of system 1 (see FIG. 1). This may for instance comprise sending information such as the radio fingerprints observed and collected by the mobile device 2 to server 3. The communication may for instance be based on a (e.g. partly) wireless connection. The communication interface(s) 23 may thus comprise circuitry such as modulators, filters, mixers, switches and/or one or more antennas to allow transmission and/or reception of signals, e.g. for the communication with server 3. In embodiments of the invention, communication interface(s) 23 are inter alia configured to allow communication according to a 2G/3G/4G/5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile terminal 2) via a wire-bound system such as for instance the internet.

Processor 20 further controls a user interface 24 configured to present information to a user of mobile device 20 and/or to receive information from such a user, such as manually input position fixes or the like. User interface 24 may for instance be the standard user interface via which a user of mobile device 2 controls other functionality thereof, such as making phone calls, browsing the Internet, etc.

Processor 20 may further control a GNSS interface 25 configured to receive a location estimate of mobile device 2, that is in particular (absolute) horizontal position information, of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case mobile device 2 has a GNSS interface 25, the user of mobile device 2 can still benefit from using positioning technologies based on other approaches, such as inertial sensors for the horizontal position, since these technologies may provide a higher accuracy in challenging environments for GNSS-based technologies. For this, the mobile device may also comprise one or more respective inertial sensors (not shown).

The components 21-26 of mobile device 2 may for instance be connected with processor 20 by means of one or more serial and/or parallel busses.

Figure 3:
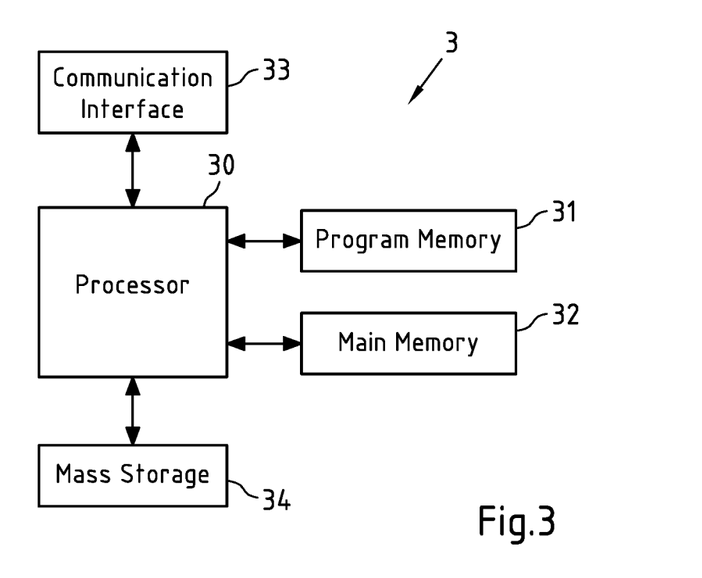
FIG. 3 is a block diagram of the server of FIG. 1.

Turning now to FIG. 3, an exemplary block diagram of server 3 of FIG. 1 is shown. Similarly to FIG. 2, server 3 comprises a processor 30. Processor 30 may represent a single processor or two or more processors, which are for instance at least partially coupled, for instance via a bus. Processor 30 executes a program code stored in program memory 31 (for instance program code causing server 3 to perform embodiments of the method according to the invention, when executed on processor 30). Processor 30 further interfaces with a main memory 32 (for instance acting as a working memory) and a mass storage 34, which may for instance collect and store a plurality of radio fingerprints collected by a plurality of devices such as device 2. Additionally, server 3 may be configured to use the radio fingerprints to create radio maps of the geographic area, in which the corresponding mobile devices have collected the radio fingerprints. A respective radio map may comprise a model of respective wireless communication nodes and/or their coverage areas for positioning purposes based on the radio fingerprints collected from mobile device 2 (and a plurality of other mobile devices of other users), as described.

Processor 30 further controls a communication interface 33 configured to receive and/or output information. For instance, server 3 may be configured to communicate with mobile device 2 of system 1, as already described above.

Figure 4A:
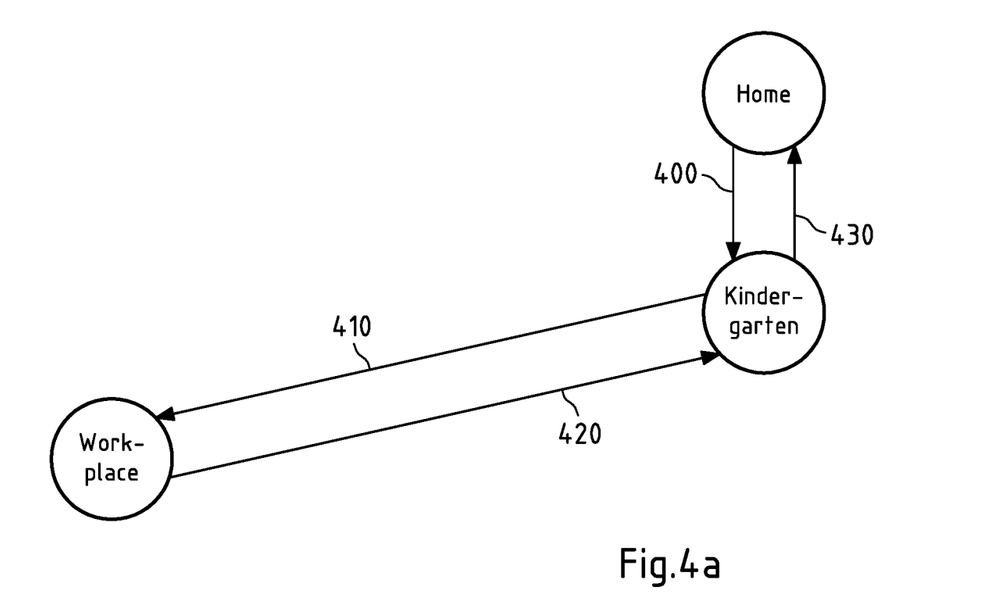
FIG. 4a-4c are schematic illustrations of examples of different routes of a mobile device, which are examples of routines and deviations therefrom.
Figure 4B:
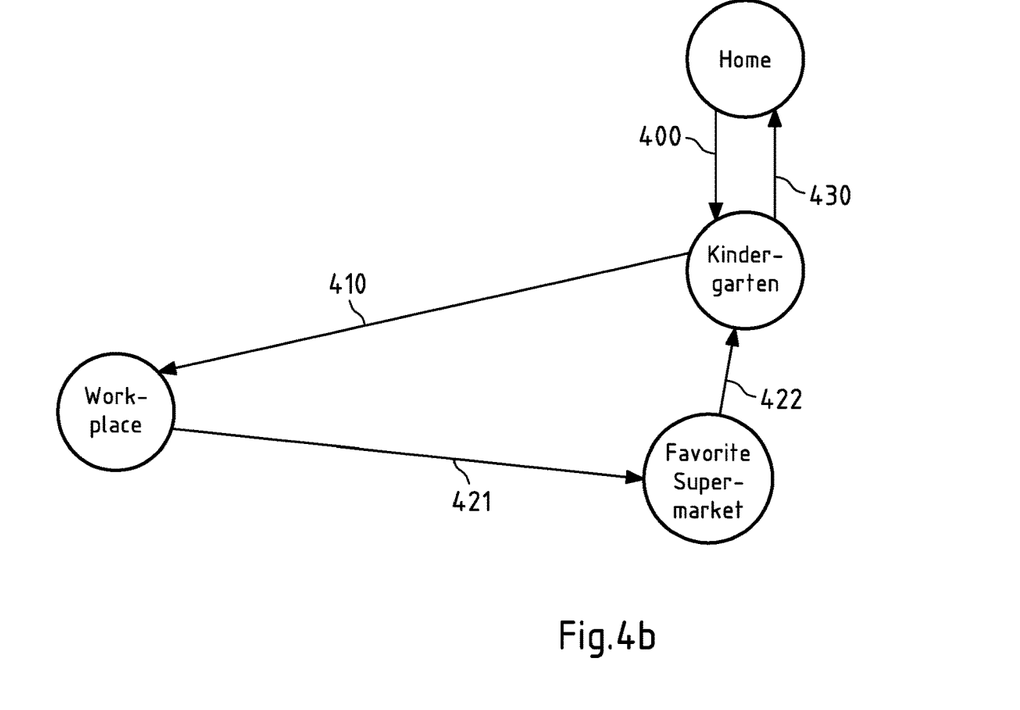
Figure 4C:
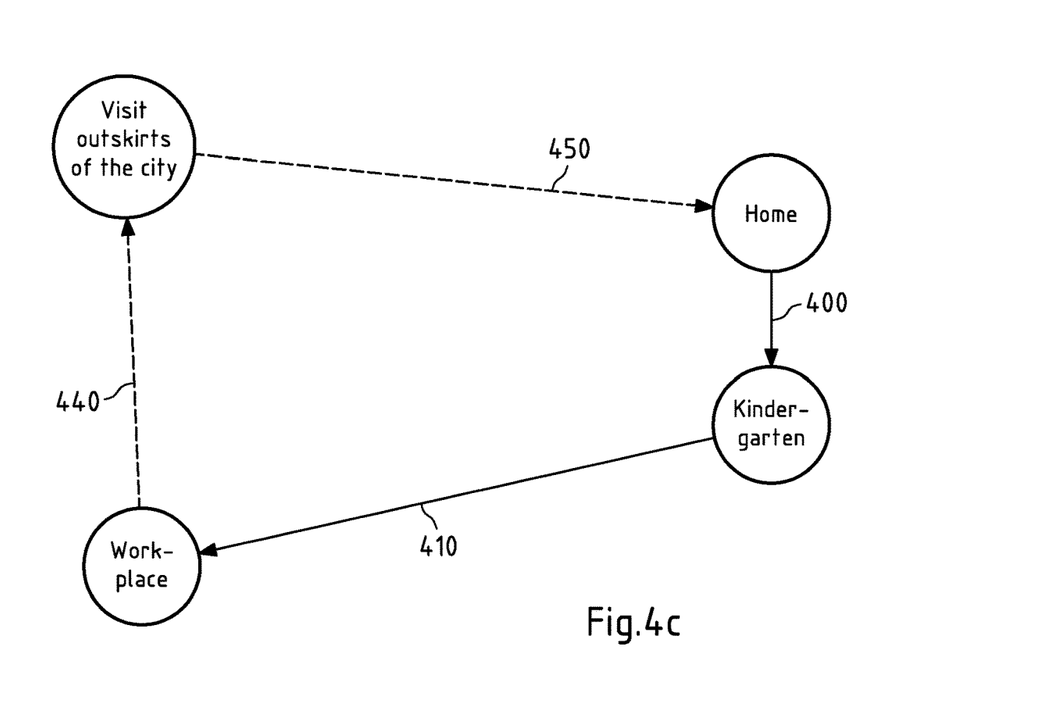

FIG. 4*a*-*c* are schematic illustrations of examples of different routes of a mobile device, which are examples of routines and deviations therefrom. Together with FIG. 5, showing a flow chart 500, an example embodiment of a method according to the invention is illustrated in the following.

Mobile devices (such as mobile phones as the most typical example) often traverse the same paths routinely. FIGS. 4a and 4b show multiple examples of such routines in the form of routes travelled regularly. FIG. 4a illustrates a typical daily commute comprising the routine route 400 from home to the kindergarten, the routine route 410 from the kindergarten to the workplace, the routine route 420 from the workplace to the kindergarten, and the routine route 430 from the kindergarten back home. Alternatively, the routes 400, 410, 420, 430 may also be considered as a single route (and thus a single routine). FIG. 4b illustrates another typical commute, which additionally to the stops at the locations shown in FIG. 4a comprises a stop at the supermarket, leading to the routes 421, 422 from the workplace to the supermarket and from the supermarket to the kindergarten. In contrast to the route of FIG. 4a, the user may take the routes of FIG. 4b e.g. only two times a week.

Figure 5:
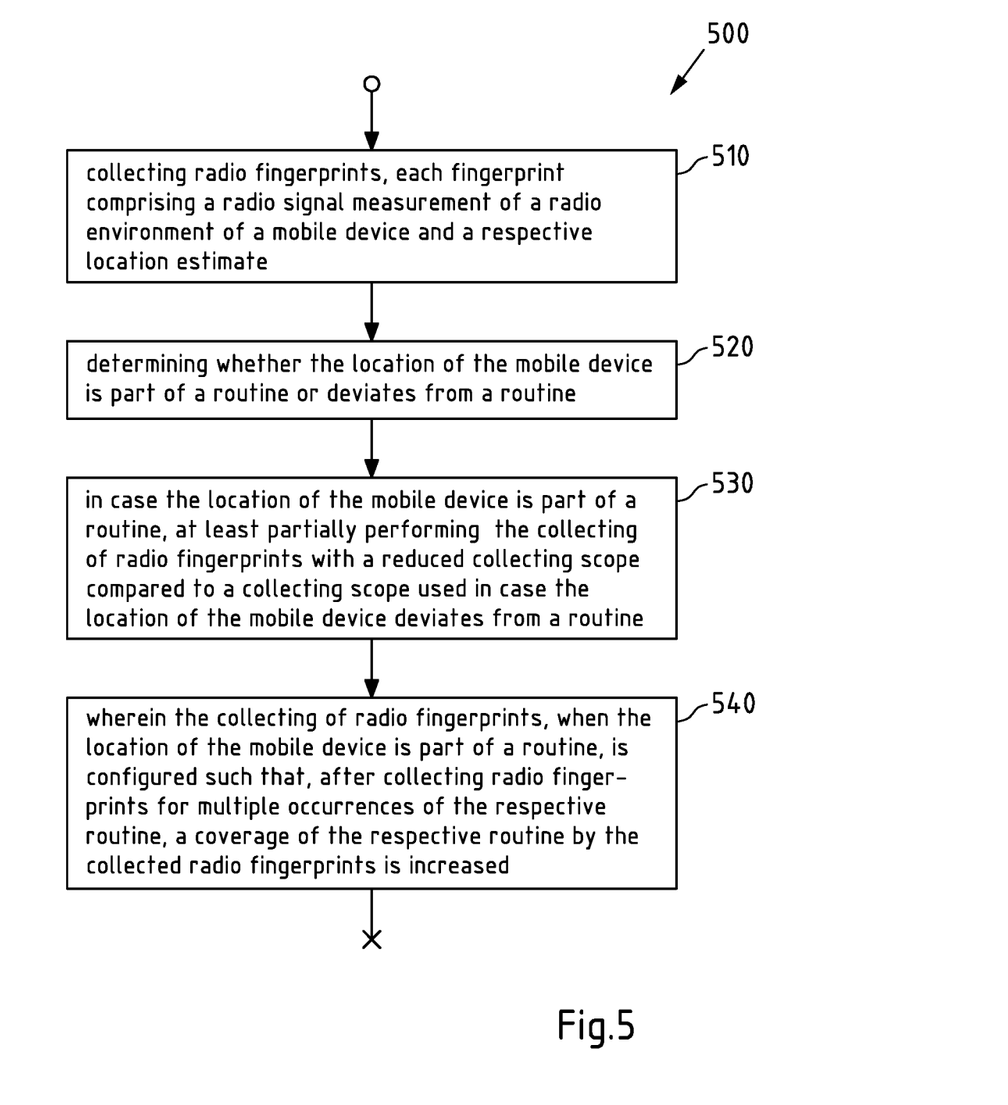
FIG. 5 is a flow chart illustrating an example embodiment of a method according to the invention.

The mobile device 2 may now collect radio fingerprints, where each fingerprint comprises a radio signal measurement of the radio environment of the mobile device 2 and a respective location estimate, action 510 of FIG. 5.

Therein, an approach of crowd sourcing of radio fingerprints would typically comprise a collection of radio fingerprints e.g. whenever some other application of the mobile device 2 uses GNSS-based positioning of the mobile device 2, or at fixed time intervals (e.g. every 10 minutes), or at fixed spatial intervals (e.g. every 500 meters). Also, it may be possible to only take radio signal measurements at specific times, e.g. by not taking measurements during the night time, for instance.

However, if these approaches are used, it can be understood, that crowd-sourcing in the described scenarios of FIG. 4a and FIG. 4b would produce a lot of redundant data. Moreover, people stay most of the day at the workplace and nights at home, also part of the evening time. Therefore, if crowdsourcing samples are taken at e.g. periodically fixed intervals, most of the data collected will be taken at the same locations or along the same routes over and over again. This wastes resources on the server side, where all the incoming data needs to be processed. Moreover, on the client-side resources are wasted on using the GNSS-based positioning, WLAN scans and data connectivity excessively.

An alternative scenario is illustrated in FIG. 4c. Here again, the routes 400 and 410 are the known routine routes, but the routes 440, 450 from the workplace to the outskirts of the city and from there back home are atypical routes deviating from the known routines. Therefore, there is a high likelihood that valuable new data can be collected while traversing these routes 440, 450.

It may now be determined (action 520), whether the location of the mobile device is part of a routine (routes 400, 410, 420, 421, 422, 430) or deviates from a routine (routes 440, 450). This can be done by an algorithm running on the mobile device 2 and/or on the server 3, which detects a deviation from the known routing paths.

The detection of such a deviation may in particular comprise machine learning the commuting patterns first. One option to realize this is to divide the geographic surface of world into predefined regions, e.g. squares with sizes of e.g. 1 km×1 km and to count the times the mobile device 2 has visited each square and when. This will provide information on the regularly and less-frequently visited predefined regions.

In case the location of the mobile device 2 is part of a routine, the collecting of radio fingerprints is at least partially performed with a reduced collecting scope (e.g. with a reduced collecting density) compared to a collecting scope (e.g. a standard collecting scope) used in case the location of the mobile device deviates from a routine, action 530. Thus, when it is detected that the user (and thus the mobile device 2) is traversing along such a routine path, data is collected in a restricted manner.

However, when collecting radio fingerprints with a reduced collecting scope compared to the collecting scope used for non-routine routes, there may be the issue that the mobile device 2 will not collect any radio fingerprints at all or that the mobile device 2 will only collect so few radio fingerprints (and only these few again and again) that changes of the radio environment may not be noticed.

Such an issue may be avoided by configuring the collecting of radio fingerprints, when the location of the mobile device is part of a routine, such that, after collecting radio fingerprints for multiple occurrences of the respective routine, a coverage of the respective routine by the collected radio fingerprints is increased (action 540).

Figure 6:
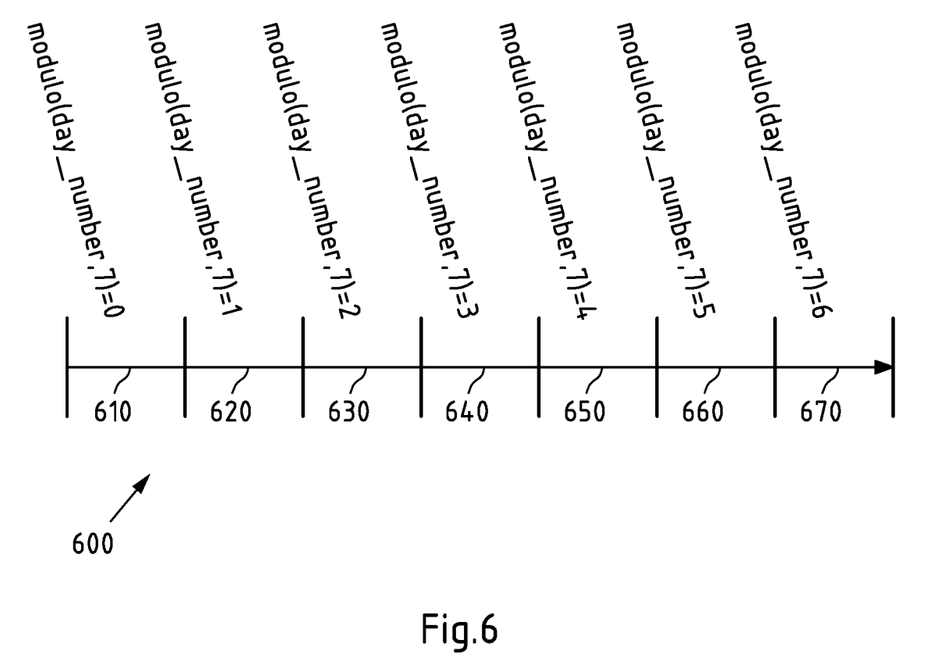
FIG. 6 is a schematic illustration of an example embodiment of obtaining radio fingerprints on a routine according to the invention.

One way to realize such an increase of the coverage of a respective routine with occurrences of the routine is explained in connection with FIG. 6. FIG. 6 is a schematic illustration of an example embodiment of obtaining radio fingerprints on a routine according to the invention.

For this, radio fingerprints are collected on a routine route 600, such as one of the routine routes 400-430 illustrated in FIG. 4, with a reduced collecting scope. By performing the collecting of radio fingerprints with a reduced collecting scope compared to a collecting scope used in case the location of the mobile device deviates from a routine, collecting redundant data can be avoided.

In this scheme however, the idea is to still collect some data (that is radio fingerprints) along the route 600, but in such a way that full data along the route 600 (that is fingerprints substantially covering the whole routine route as if the fingerprints were collected with the higher or standard collecting scope) is collected after multiple occurrences of the routine 600. In the example, as the routine 600 occurs every day, full data is collected over a week by use of a modulo operation with regard to the weeks of the day. For this, the route is divided into n=7 segments 610-670 and throughout the week each day radio fingerprints of a different of the seven segments 610-670 of the route 600 are collected: on Monday the algorithm collects data over the first segment 610 of the route, on Tuesday over the second segment 620 and so on with the same repeating the week after.

Advantageously, at the server side, only relevant crowdsourced data may be received instead of a large amount being just the repeat of the routine routes. At the client side, this also enables efficient active GNSS and WLAN scanning for crowd-sourcing purposes, because the most effective data can be identified, hence avoiding excessive battery consumption.

Figure 7:
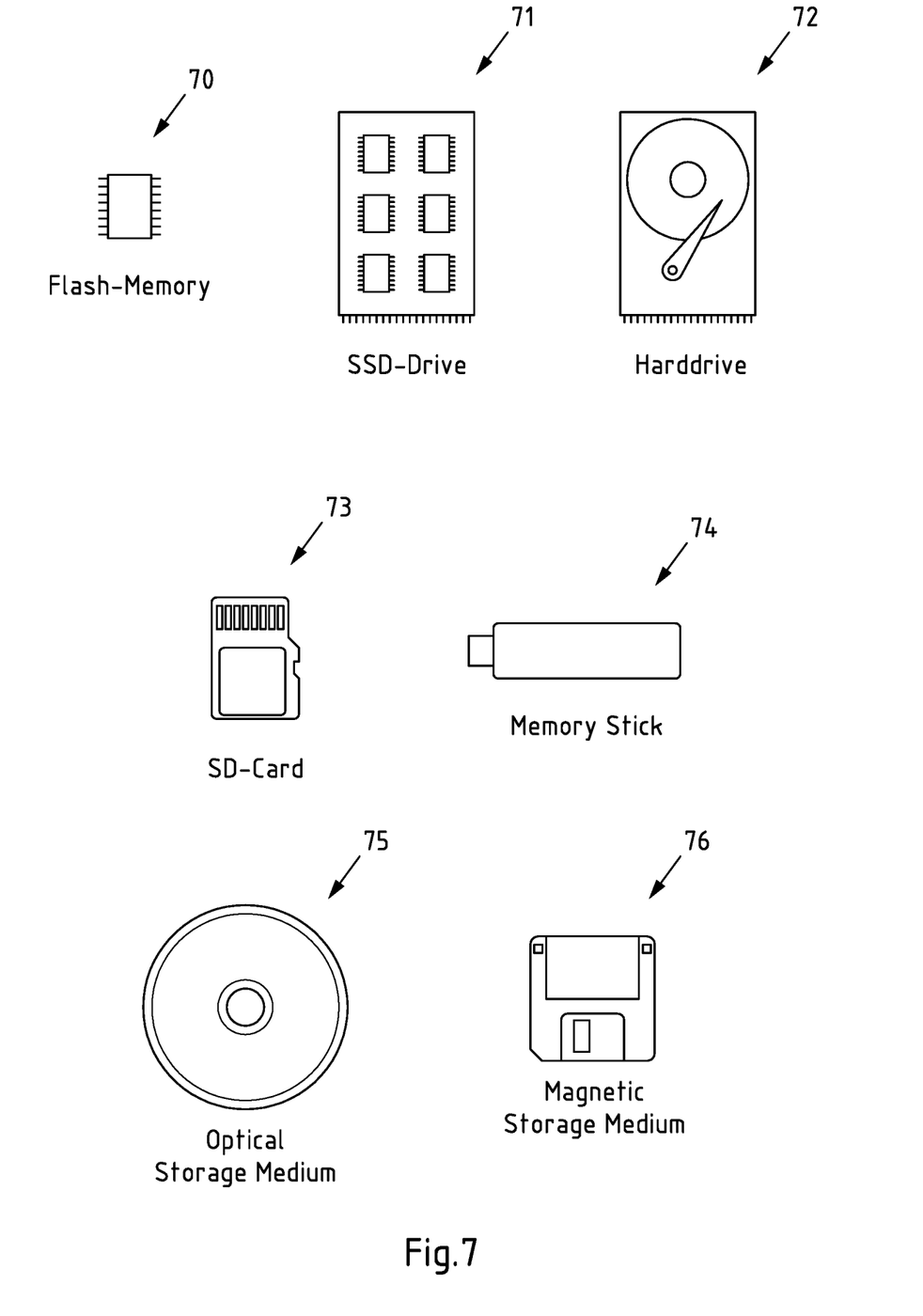
FIG. 7 is a schematic illustration of examples of tangible storage media according to the present invention.

FIG. 7 is a schematic illustration of examples of tangible storage media according to the present invention, that may for instance be used to implement program memory 21 of FIG. 2 and/or program memory 31 of FIG. 3. To this end, FIG. 7 displays a flash memory 70, which may for instance be soldered or bonded to a printed circuit board, a solid-state drive 71 comprising a plurality of memory chips (e.g. Flash memory chips), a magnetic hard drive 72, a Secure Digital (SD) card 73, a Universal Serial Bus (USB) memory stick 74, an optical storage medium 75 (such as for instance a CD-ROM or DVD) and a magnetic storage medium 76.

The following embodiments shall also be considered disclosed:

1) A method, performed by at least one apparatus, the method comprising:
    collecting radio fingerprints, each fingerprint comprising a radio signal measurement of a radio environment of a mobile device and a respective location estimate;
    determining whether the location of the mobile device is part of a routine or deviates from a routine;
    in case the location of the mobile device is part of a routine, at least partially performing the collecting of radio fingerprints with a reduced collecting scope compared to a collecting scope used in case the location of the mobile device deviates from a routine;
    wherein the collecting of radio fingerprints, when the location of the mobile device is part of a routine, is configured such that, after collecting radio fingerprints for multiple occurrences of the respective routine, a coverage of the respective routine by the collected radio fingerprints is increased.
2) The method of embodiment 1, wherein the collecting of radio fingerprints, when the location of the mobile device is part of a respective routine, is configured such that, after collecting radio fingerprints for a sufficient number of occurrences of the respective routine, the collected radio fingerprints substantially cover the whole respective routine.
3) The method of embodiment 1 or 2, wherein a respective routine is divided into multiple segments, wherein, for a certain occurrence of a respective routine, radio fingerprints are collecting only for a part of the segments of the respective routine.
4) The method of embodiment 3, wherein, for each occurrence of a respective routine, radio fingerprints are collected for a segment of the respective routine other than for the previous occurrence of the routine.
5) The method of any of embodiments 1 to 4, wherein a respective routine is divided into multiple segments, wherein, for each segment, the probability that radio fingerprints are collected for the respective segment is smaller than 1.
6) The method of any of embodiment 1 to 5, wherein a respective routine is divided into n segments, wherein, for each of the n segments, the probability that radio fingerprints are collected for the respective segment is inversely proportional to n.
7) The method of any of embodiments 1 to 6, wherein the collecting scope is a spatial and/or temporal collecting scope.
8) The method of any of embodiments 1 to 7, wherein the method further comprises:
    automatically determining one or more routines of the mobile device at least based on position information of the mobile device.
9) The method of any of embodiments 1 to 8, wherein the method further comprises:
    obtaining visiting information of visits of the mobile device in predefined regions of a geographic area.
10) The method of embodiment 9, wherein the visiting information of a visit of the mobile device in a predefined region comprises one or more of:
    information representative of a time of the visit,
    information representative of a duration of the visit,
    information representative of a frequency of the visit,
    information representative of an amount of data collected for the predefined region, and/or
    information representative of a quality of the data collected for the predefined region.
11) The method of embodiment 9 or 10, wherein the method further comprises, upon entering a predefined region, deciding whether to:
    start or proceed with the collecting of radio fingerprints, or
    stop or refrain from the collecting of radio fingerprints.
12) The method of embodiment 11, wherein the deciding is at least partially based on the visiting information.
13) The method of embodiment 11 or 12, wherein the deciding is at least partially based on a probability depending on the amount of data already collected for the predefined region.
14) The method of any of embodiments 9 to 13, wherein the method further comprises:
    obtaining a collecting scope to be used for a predefined region.
15) The method of any of embodiments 9 to 14, wherein the collecting scope is a predefined collecting scope or determined at least partially based on the visiting information.
16) An apparatus comprising at least one processor and at least one memory including computer program code, the at least one memory and the computer program code configured to, with the at least one processor, cause the apparatus at least to perform a method of any of embodiments 1 to 15.
17) The apparatus of embodiment 16, wherein the apparatus is one of:
    a chip;
    a module for a server;
    a server;
    a module for a mobile device; and
    a mobile device.
18) A computer readable storage medium in which computer program code is stored, the computer program code causing at least one apparatus perform when executed by a processor a method of any of embodiments 1 to 15.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, performed by at least one apparatus, the method comprising:
   collecting radio fingerprints, each fingerprint comprising a respective radio signal measurement of a radio environment of a mobile device and a respective location estimate;
   determining whether a location of the mobile device is part of a routine or deviates from the routine; and
   in case the location of the mobile device is part of the routine, performing the collecting of radio fingerprints, respectively during a given occurrence of the routine from among different occurrences of the routine, with a reduced overall collecting scope compared to a collecting scope used in case the location of the mobile device deviates from the routine;
   wherein the collecting of radio fingerprints, when the location of the mobile device is part of the routine, comprises collecting radio fingerprints, respectively during the different occurrences of the routine, over different segments of the routine so as to provide for more coverage of the routine after radio fingerprints have been collected for multiple occurrences of the routine.

2. The method of claim 1, wherein the collecting of radio fingerprints, when the location of the mobile device is part of the routine, is configured such that, after collecting radio fingerprints for a number of occurrences of the routine, the collected radio fingerprints substantially cover the whole routine.

3. The method of claim 1, wherein, for a number of occurrences of the routine, radio fingerprints are collected only for a part of the segments of the routine.

4. The method of claim 3, wherein, for each occurrence of the routine, radio fingerprints are collected for a segment of the routine other than a segment for which radio fingerprints were collected during the previous occurrence of the routine.

5. The method of claim 1, wherein the routine is divided into multiple segments, and wherein, for each segment, the probability that radio fingerprints are collected for a respective segment is smaller than 1.

6. The method of claim 1, wherein the routine is divided into n segments, and wherein, for each of the n segments, the probability that radio fingerprints are collected for a respective segment is inversely proportional to n.

7. The method of claim 1, wherein the collecting scope used in case the location of the mobile device deviates from the routine is a spatial and/or temporal collecting scope.

8. The method of claim 1, wherein the method further comprises:
   automatically determining one or more routines of the mobile device at least based on position information of the mobile device.

9. The method of claim 1, wherein the method further comprises:
   obtaining visiting information of visits of the mobile device in predefined regions of a geographic area.

10. The method of claim 9, wherein the visiting information of a visit of the mobile device in a predefined region comprises one or more of:
    information representative of a time of the visit,
    information representative of a duration of the visit,
    information representative of a frequency of the visit,
    information representative of an amount of data collected for the predefined region, and/or
    information representative of a quality of the data collected for the predefined region.

11. The method of claim 9, wherein the method further comprises, upon entering a predefined region, deciding whether to:
    start or proceed with the collecting of radio fingerprints, or
    stop or refrain from the collecting of radio fingerprints.

12. The method of claim 11, wherein the deciding is at least partially based on the visiting information.

13. The method of claim 11, wherein the deciding is at least partially based on a probability depending on the amount of data already collected for the predefined region.

14. The method of claim 9, wherein the method further comprises:
    obtaining a collecting scope to be used for a predefined region.

15. The method of claim 14, wherein the collecting scope is a predefined collecting scope or determined at least partially based on the visiting information.

16. An apparatus comprising at least one processor and at least one memory including computer program code, the at least one memory and the computer program code configured to, with the at least one processor, cause the apparatus at least to perform:
    collecting radio fingerprints, each fingerprint comprising a respective radio signal measurement of a radio environment of a mobile device and a respective location estimate;
    determining whether a location of the mobile device is part of a routine or deviates from the routine; and
    in case the location of the mobile device is part of the routine, performing the collecting of radio fingerprints, respectively during a given occurrence of the routine from among different occurrences of the routine, with a reduced overall collecting scope compared to a collecting scope used in case the location of the mobile device deviates from the routine;

wherein the collecting of radio fingerprints, when the location of the mobile device is part of the routine, comprises collecting radio fingerprints, respectively during the different occurrences of the routine, over different segments of the routine so as to provide for more coverage of the routine after radio fingerprints have been collected for multiple occurrences of the routine.

17. The apparatus of claim 16, wherein the apparatus is one of:
   a chip;
   a module for a server;
   a server;
   a module for a mobile device; or
   a mobile device.

18. A non-transitory computer readable storage medium in which computer program code is stored, the computer program code causing at least one apparatus to perform the following when executed by a processor:
   collecting radio fingerprints, each fingerprint comprising a respective radio signal measurement of a radio environment of a mobile device and a respective location estimate;
   determining whether a location of the mobile device is part of a routine or deviates from the routine; and
   in case the location of the mobile device is part of the routine, performing the collecting of radio fingerprints, respectively during a given occurrence of the routine from among different occurrences of the routine, with a reduced overall collecting scope compared to a collecting scope used in case the location of the mobile device deviates from the routine;
   wherein the collecting of radio fingerprints, when the location of the mobile device is part of the routine, comprises collecting radio fingerprints, respectively during the different occurrences of the routine, over different segments of the routine so as to provide for more coverage of the routine after radio fingerprints have been collected for multiple occurrences of the routine.

* * * * *